(12) United States Patent
Alderton

(10) Patent No.: US 6,263,192 B1
(45) Date of Patent: Jul. 17, 2001

(54) METHODS AND APPARATUS FOR DC-DC CONVERTER SYNCHRONIZATION IN A MOBILE DC-POWERED DEVICE

(75) Inventor: Martin Alderton, San Diego, CA (US)

(73) Assignee: Uniden America Corporation, Fort Worth, TX (US)

( * ) Notice: Subject to any disclaimer, the term of this patent is extended or adjusted under 35 U.S.C. 154(b) by 0 days.

(21) Appl. No.: 09/074,259

(22) Filed: May 7, 1998

(51) Int. Cl.⁷ .................................................. H04B 1/38
(52) U.S. Cl. .......................... 455/73; 455/557; 455/550; 455/572; 455/574
(58) Field of Search .................................. 455/502, 571, 455/572, 127, 298, 299, 73, 343, 310, 557, 574, 550; 375/219, 354, 371, 373, 222; 370/350, 503, 516

(56) References Cited

U.S. PATENT DOCUMENTS

| | | | |
|---|---|---|---|
| 4,718,080 | * | 1/1988 | Serrano et al. ........................ 455/550 |
| 5,524,044 | * | 6/1996 | Takeda .................................. 455/550 |
| 5,606,740 | * | 2/1997 | Niratsuka et al. .................... 455/343 |
| 5,764,648 | * | 6/1998 | Yamane et al. ....................... 370/350 |
| 5,933,769 | * | 8/1999 | Kaneko ................................. 455/310 |
| 6,049,724 | * | 6/2000 | Rozenblit et al. ................... 455/572 |
| 6,061,453 | * | 5/2000 | Bach .................................... 380/270 |

OTHER PUBLICATIONS

Data sheet for VLSI Technologies, Wireless Communications, Ruby II Advanced communication Processor.
Data sheet for National Semiconductor, INS8250, INS8250–B Universal Asynchronous Receiver/Transmitter.
Data sheet for Linear Technology, LT1375/Lt1376, 1.5A 500kHz Step Down Switching Regulators.

\* cited by examiner

Primary Examiner—William G. Trost
Assistant Examiner—Marceau Milord
(74) Attorney, Agent, or Firm—Howrey Simon Arnold & White, LLP

(57) ABSTRACT

Methods and apparatus for performing DC—DC converter synchronization in a mobile DC-powered device in which the variable clock output of a serial communications circuit is utilized to synchronize the clock which provides the switching function in the DC—DC converter.

32 Claims, 18 Drawing Sheets

METHODS AND APPARATUS FOR DC-DC CONVERTER SYNCHRONIZATION IN A MOBILE DC-POWERED DEVICE

BACKGROUND OF THE INVENTION

This invention relates generally to methods and apparatus for DC—DC converter synchronization in a mobile device, such as a DC-powered mobile communications device, and more specifically, to such methods and apparatus in which a variable clock from a serial communications port is used to synchronize a switching clock of the DC—DC converter.

In mobile DC-powered devices, particularly a mobile DC-powered communications device or transceiver such as a wireless modem or handset powered by a DC power source such as a battery, but also including devices such as a GPS receiver, a DC—DC converter is provided to condition the DC level of the output of the DC power source by stepping it up or down to a different level. The DC—DC converter typically operates by receiving the incoming DC voltage from the power source or battery, chopping it at a high frequency, and then filtering it to provide the stepped up or down DC voltage.

For efficiency and size reasons, it is desirable that the converter switching frequency be as high as possible and the switching waveform be as square as possible. Consequently, harmonics of the switching frequency are generated up to RF frequencies. Also, the stability of the switching frequency tends to be very poor and vary with temperature, line, and load conditions since the clock typically used to drive the chopping action in the DC—DC converter is provided from a low-Q source internal to the converter.

Consequently, as a practical matter, noise will be introduced into the DC voltage output from the converter at frequencies related to the harmonics of the switching frequency. Consequently, due to the instability and high frequency of this chopping action, there may be times when the frequency of this noise falls within the frequency band of the transceiver of the device, and thus interfere with its operation.

To avoid such interference, it is desirable to synchronize the clock used to drive the switching or chopping action of the DC—DC converter, typically an internal clock, with an external and stable clock source having a frequency determined so that the noise introduced into the DC output of the converter by the chopping action does not fall within the frequency band of the transceiver.

One approach which has been proposed for synchronizing the DC—DC converter is to provide a clock on a dedicated pin of the chipset of the baseband/microcontroller circuitry derived from the crystal oscillator used to drive the circuitry within this chipset.

The problem with this approach is that, in the case in which the design of the baseband/microcontroller circuitry is fixed and predetermined, such as the case in which the chipset embodying this circuitry is obtained from an outside vendor, or the case in which upward compatibility with a predecessor product is desired, and the baseband/microcontroller circuitry in a successor product is slated to be the same as that in this predecessor product, expensive modifications or upgrades will have to be performed to or upon this circuitry in order to provide the dedicated pin with a clock at a frequency appropriate for DC—DC synchronization.

Another problem, even in the case in which the design of the baseband/microcontroller circuitry is not fixed and predetermined, and there is an opportunity to incorporate into the initial design thereof a dedicated synchronization pin, unacceptable constraints might thereby be placed on the frequency band of the transceiver.

Consider the case in which a synchronization clock is provided at a dedicated synchronization pin at a frequency determined appropriate for the anticipated frequency band of the transceiver, but then, after the design is fixed, the desired frequency band of the transceiver changes. An expensive modification or upgrade may have to be made to the baseband/microcontroller circuitry in order to change the frequency of the synchronization clock and accommodate the change in the frequency band of the transceiver.

Accordingly, it is an object of the subject invention to provide methods and apparatus for DC—DC converter synchronization in a mobile DC-powered device, particularly but not limited to a mobile communications device, which avoids expensive hardware upgrades or modifications to preexisting baseband/microcontroller circuitry.

Another object is to provide methods and apparatus for DC—DC converter synchronization in a mobile DC-powered device which can be easily be used with fixed and predetermined baseband/microcontroller circuitry.

Another object is to provide methods and apparatus for DC—DC converter synchronization in a mobile DC-powered device which can easily accommodate changes in the frequency band of the transceiver thereof.

A further object is to provide methods and apparatus for DC—DC converter synchronization in a mobile DC-powered device which overcome the disadvantages of the prior art.

Further objects of the subject invention include utilization or achievement of the foregoing objects, alone or in combination. Additional objects and advantages will be set forth in the description which follows, or will be apparent to those of ordinary skill in the art who practice the invention.

SUMMARY OF THE INVENTION

To achieve the foregoing objects, and in accordance with the purpose of the invention as broadly described herein, there is provided a mobile DC-powered device comprising: a DC power supply for providing a first DC output voltage; a DC—DC converter configured to receive the first DC output voltage and produce responsive to a switching action a second DC output voltage for powering components of the data communications device; a first clock for driving the switching action; and a serial communications circuit having a second variable frequency clock set at a frequency determined appropriate for DC—DC converter synchronization in which the second clock is configured to synchronize the first clock which drives the switching action of the DC—DC converter.

There is also provided a related method for synchronizing a DC—DC converter in a mobile DC-powered device comprising the steps of: selecting a synchronization frequency to avoid interference with a frequency band of the communications device; providing a first variable frequency clock of a serial communications circuit of the device; fixing the frequency of the first clock to the synchronization frequency; converting a first DC voltage to a second DC voltage responsive to a switching action driven by a second clock; using the second DC voltage to power the device; and synchronizing the second clock using the first clock.

Additional related apparatus and methods are also provided.

DESCRIPTION OF THE PREFERRED EMBODIMENTS

Figure 1:
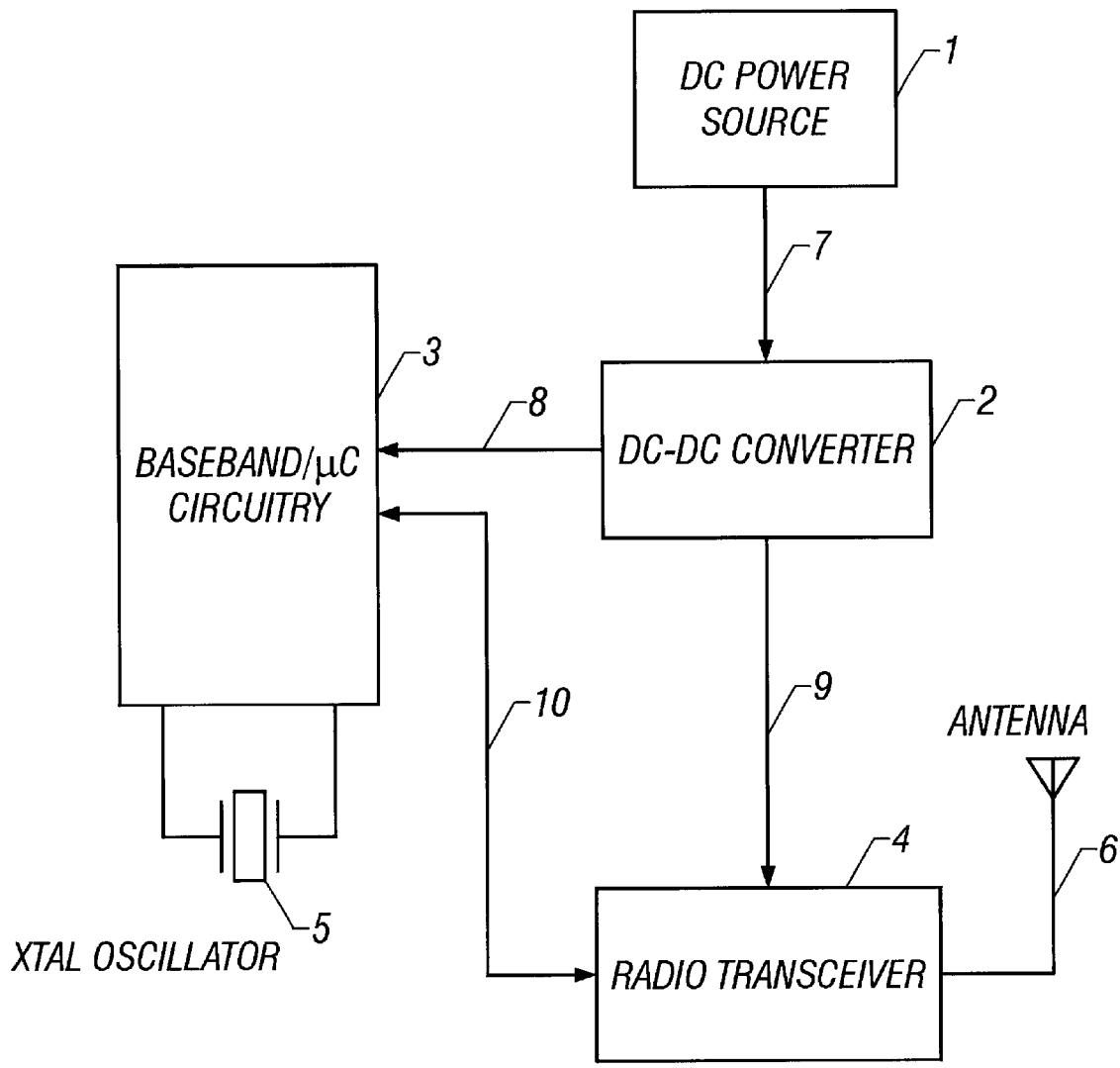
FIG. 1 is a diagram of the major components of a mobile communications device.

FIG. 1 illustrates the major components of a mobile communications device, particularly a mobile communications device such as a wireless handset or modem, in which the device is powered by a DC power supply such as a battery. As shown, DC power source 1 is coupled to DC—DC converter 2, which in turn is coupled to baseband/microcontroller circuitry 3 and radio transceiver 4. The baseband/microcontroller circuitry is driven by crystal oscillator 5, and the radio transceiver is coupled to antenna 6.

DC power source 1 provides a DC voltage on signal line 7, the level of which is assumed to be inappropriate for the purpose of directly powering the components of the mobile communications device, including baseband/microcontroller circuitry 3 and radio transceiver 4. DC—DC converter 2 receives this DC voltage from DC power source 1, and converts into a DC voltage having a level suitable for directly powering the components of the mobile communications device responsive to a switching or chopping action driven by a clock, typically an internal clock. As shown in the figure, this DC voltage is then provided to the components of the mobile communications device, including baseband/microcontroller circuitry 3 and radio transceiver 4, through signal lines 8 and 9 respectively.

Figure 10:
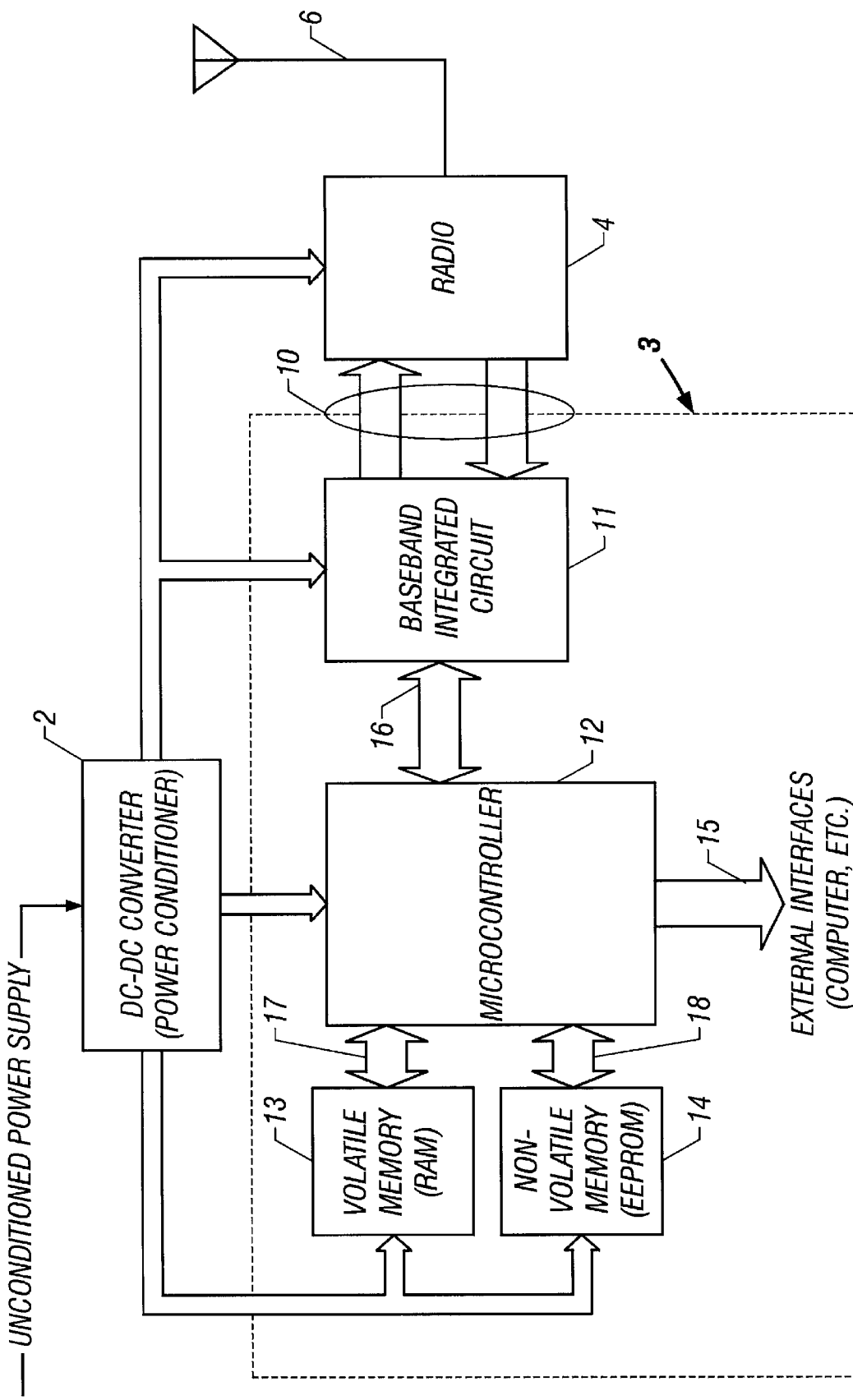
FIG. 10 is an illustration of the major components of a baseband/microcontroller circuitry chipset in a mobile communications device.
Figure 11:
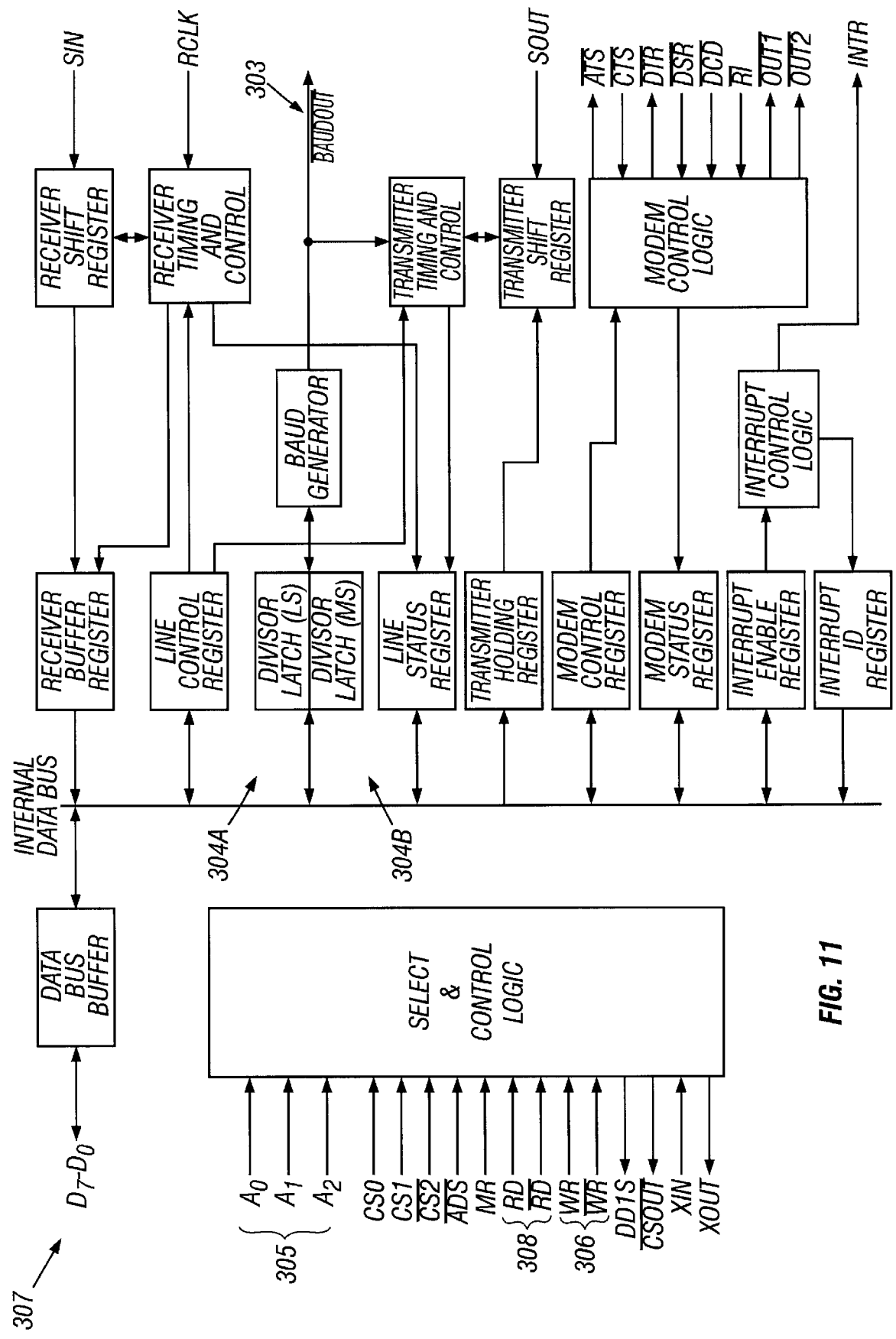
FIG. 11 is a block diagram of a standard 8250 UART.

The major components of baseband/microcontroller circuitry 3 are illustrated in FIG. 10, in which, compared to FIG. 1, like elements are referenced with like identifying numerals. As shown in FIG. 10, this circuitry typically comprises a microcontroller 12 coupled to volatile memory 13, typically RAM, and non-volatile memory 14, typically EEPROM, through signal lines 17 and 18 respectively. Also included are a plurality of parallel or serial interfaces 15, such as UARTs, through which the microcontroller is able to communicate with external devices, including but not limited to a laptop computer, display, printer, modem, microphone, speaker, or the like. In an exemplary application, one of these interfaces might be utilized to enable the display of e-mail messages received over the Internet through the mobile communications device.

As shown, the circuitry further comprises baseband integrated circuit 11 which is coupled to the microcontroller through signal lines 16. Baseband integrated circuit 11 in turn is coupled to radio transceiver 4 through bidirectional signal lines 10.

The basic operation of the major components of the mobile communications device shown in FIGS. 1 and 10 is as follows:

The DC power source 1 acts as a reservoir of energy which is accessed by the DC—DC converter 2 to power the baseband/microcontroller circuitry 3 and the radio transceiver 4. The DC—DC converter 2 acts to condition this energy so that the required voltage is available to the baseband/microcontroller circuitry 3 and transceiver 4. The baseband/microcontroller circuitry 3 processes information, whether digital or voice or otherwise, which is desired to be transmitted, such that it is suitable for transmission by the transceiver 4. It also decodes information received by the transceiver 4 and formats it in such a way as to be accessible by the user, whether as voice samples, data, etc. In an exemplary embodiment, the baseband/microcontroller circuity 3 is a chipset of two integrated circuit chips, the first of which comprises the microcontroller 12, related memories 13 and 14, and UARTs 15, and the second of which comprises the baseband circuit 11, consisting of digital-to-analog converters ("DACs") and the like for interfacing to the transceiver.

The radio transceiver 4 modulates a carrier using the information coming from the baseband/microcontroller circuitry 3 so that the carrier when transmitted can be decoded by a distant receiver. It also demodulates a carrier received from a distant transmitter and passes the demodulated information to the baseband/microcontroller 3 for decoding. These components and their operation will be apparent to those of skill in the art, and need not be explained further.

Figure 2:
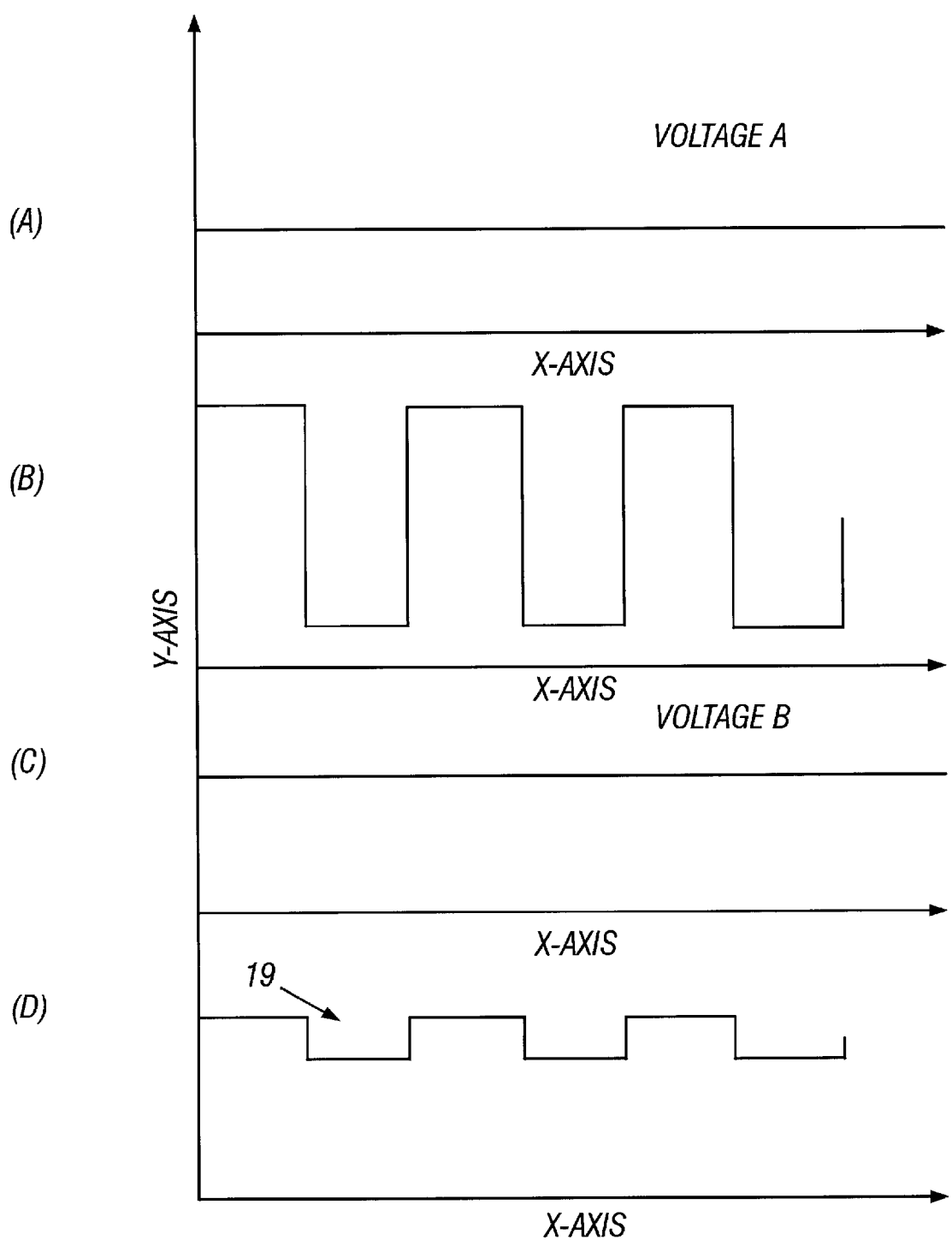
FIGS. 2(a)–2(d) are diagrams of the waveforms related to the chopping action of the DC—DC converter in such a device.

FIG. 2 illustrates the waveforms associated with the conversion by DC—DC converter 2 of the DC voltage provided by DC power source 1. FIG. 2(a) illustrates the DC voltage provided by the DC power source. The level of the output, designated "Voltage A" in the figure, is assumed to be inappropriate for directly powering the components of the mobile communications device. FIG. 2(b) illustrates the high frequency chopping waveform used to perform the chopping action within the DC—DC converter 2.

FIG. 2(c) is an idealized waveform showing the DC voltage output from the DC—DC converter. The waveform is idealized in that the noise introduced by the chopping action of the DC—DC converter is not represented. The level of this output, designated "Voltage B" in the figure, is appropriate for directly powering the components of the mobile communications device.

FIG. 2(d) is a rendition of the DC voltage output from the DC—DC converter including a depiction of the noise introduced by the chopping action of the DC—DC converter. In the figure, the noise which is introduced, identified with numeral 19, is shown as having the same frequency as the chopping waveform of FIG. 2(b), and as having a square shape. It should be appreciated, however, that these features are for purposes of illustration only, and that, in practice, the frequency of the noise will be at one or more of the harmonics of the frequency of the chopping waveform, and the shape thereof will be highly irregular.

Figure 3:
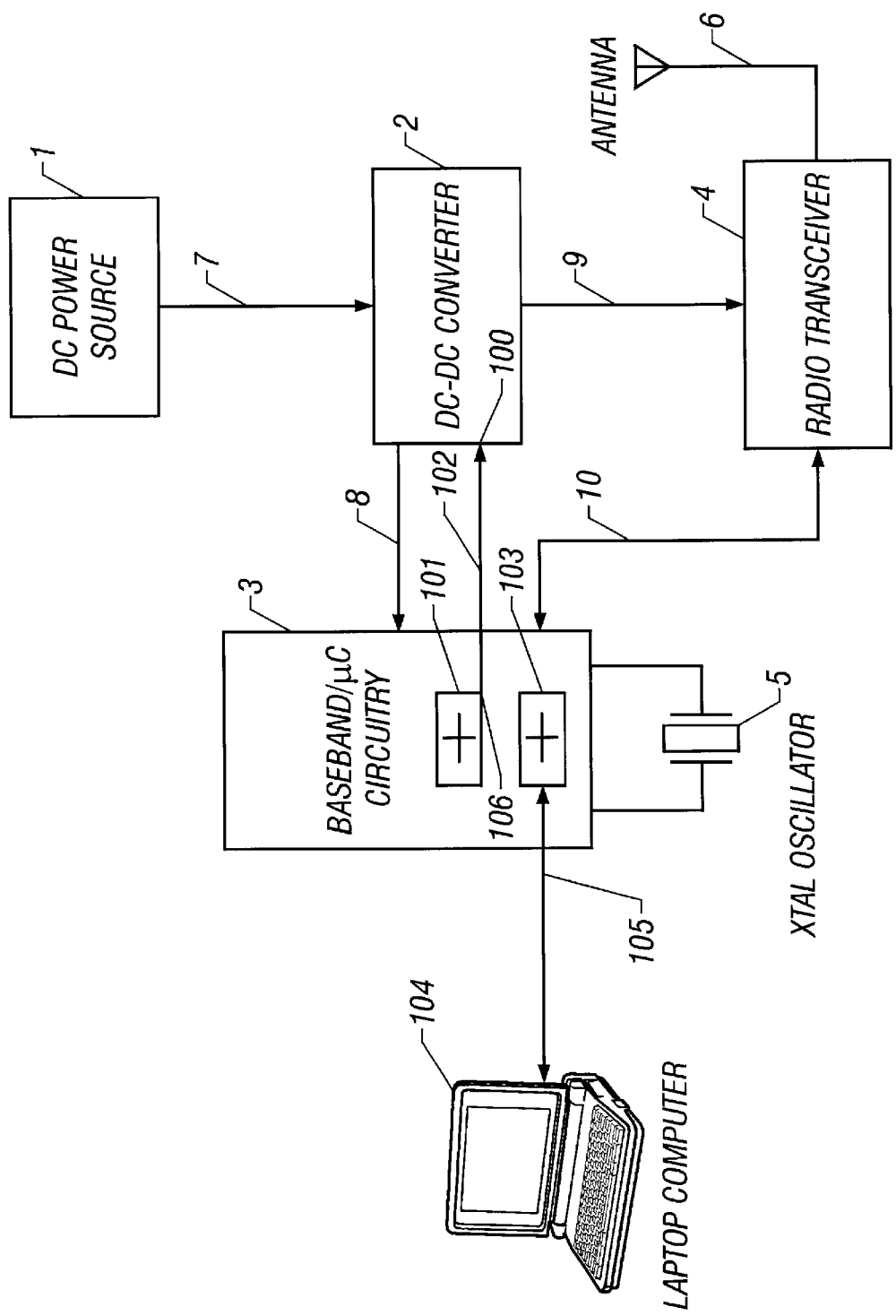
FIG. 3 is an illustration of a first embodiment of the subject invention.

FIG. 3 illustrates a first embodiment of the subject invention in which, compared with FIG. 1, like elements are referred to with like identifying numerals.

According to this first embodiment, baseband/microcontroller circuitry 3 includes first and second Universal Asynchronous Receivers/Transmitters ("UART"), identified with numerals 103 and 101, the ostensible purpose of which is to provide a serial communications port between microcontroller 12 of FIG. 10, and any one of various peripheral devices, such as laptop 104 shown in FIG. 3. Advantageously, these UARTs are any of the commercially available UARTs having a variable frequency transmit clock output, such as any of the commercially available 16550A, 16550AF, or 16550AFN FIFO UARTs, or the standard 8250, 16450, 16C450, or 16550 UARTs.

In accordance with this embodiment, only one of these UARTs, the one identified with numeral 103 in the figure, in fact functions in this normal mode. The other, the one identified with numeral 101, is dedicated to the function of synchronizing the switching frequency of DC—DC converter 2, which advantageously is any commercially available switching regulator having a synchronization input for an internal clock which drives the switching process, such as the Linear Technology 1.5A, 500 kHz Step-Down Switching Regulator. However, it should be appreciated that regulators are possible in which the clock utilized for the switching function is externally generated. By dedicating one of these UARTs to this function, synchronization of the DC—DC converter can be performed without the expensive hardware upgrade or modification to the baseband/microcontroller circuitry chipset that would have otherwise been required.

In accordance with the foregoing, and with reference to FIG. 3, UART 103 functions to provide a serial communications port between microcontroller 12 of FIG. 10 and peripheral device 104. This port allows transmission (from the microcontroller to the peripheral device) of serial data over signal line 105 in accordance with a variable baud rate determined appropriate to the peripheral device. The appropriate baud rate for a peripheral device depends on the rate at which the device is equipped to sample the incoming data: the greater the sampling rate of the peripheral device, the greater the baud rate of the UART can be.

The baud rate of transmission is determined by a variable frequency transmit clock (not shown) provided as an output pin of the chip embodying UART 103. The frequency of this transmit clock is variable to allow the UART to function with many different peripheral devices, including laptops, terminals, modems, hard-copy devices (printers, plotters) and the like. To select a baud rate appropriate for a particular peripheral device, a user simply selects an appropriate UART transmit frequency or baud rate, and writes it into an appropriate buffer or register on the UART chip. The transmit clock of the UART is then provided at the output pin at the selected frequency or baud rate.

To illustrate the foregoing, a block diagram of a National Semiconductor INS 8250/INS 8250-B UART is provided in FIG. 1. A variable transmit clock or baud rate is provided on the /BAUDOUT pin, identified with numeral 303 in the figure. The baud rate provided is equal to the main reference oscillator frequency divided by the specified divisor in the Baud Generator Divisor Latches, identified with numerals 304a and 304b in the figure. When the value 0 0 0 is placed on the address pins A2, A1, A0 respectively, the least significant byte of the Divisor Latches, identified by numeral 304a, is accessible; when the value 0 0 1 is placed on the address pins, the most significant byte of the Divisor Latch, identified with numeral 304b, is accessible. When the write pin, identified with numeral 306, is asserted, the value on the data pins, identified with numeral 307, can be written into the Divisor Latch. When the read pin, identified with numeral 308, is asserted, the value stored in the Divisor Latch can be read out on the data pins. Additional information is available in the data sheet for the National Semiconductor INS 8250, INS 8250-B Universal Asynchronous Receiver/Transceiver, which is hereby fully incorporated by reference herein as though set forth in full.

The port also allows reception (from the peripheral device to the microcontroller) of data over signal line 105 at a rate determined by a receiver clock which is provided as an input to a pin on the chip embodying the UART. Typically, the receiver clock input will be the transmit clock output of a corresponding UART situated at the peripheral device handling the transmission of data over the port.

With reference to FIG. 3, UART 101 is dedicated to performing synchronization of DC—DC converter 2. To this end, transmit clock 106 of UART 101 is provided through signal line 102 to synchronization input 100 of DC—DC converter 2. Internal circuitry within the DC—DC converter (not shown) then takes this input and utilizes it to synchronize the internal clock from which the chopping waveform discussed previously is derived.

This embodiment is particularly useful in those cases in which the transmit clock of UART 101 cannot simultaneously or concurrently perform DC—DC converter synchronization and serial transmission of data. Such a case might exist if, for example, a UART transmit clock frequency is not possible which both satisfies the requirements of the DC—DC converter synchronization function, i.e., is compatible with the switching frequency of the DC—DC converter, yet lacks harmonics which avoid overlap with the frequency band of the transceiver, and the requirements of serial transmission to a peripheral device, i.e., is slow enough to accommodate the sampling rate of the peripheral device. In such a case, a dedicated mode of operation in which the UART is dedicated to the function of DC—DC converter synchronization in accordance with this embodiment might be appropriate.

Two distinct variants are possible with this embodiment. In a first variant, UART 101 is dedicated to the function of performing DC—DC converter synchronization, and does not function in any capacity as a serial communications port, either for transmitting data to or receiving data from a peripheral device.

In a second variant, UART 101 is configured to allow for the serial receipt of data from a peripheral device. Such a variant is possible in this embodiment because the baud rate for the receipt of data in the UART is determined by a receiver clock input of the UART, and is thus determined independently of the baud rate for the transmission of data. Thus, unlike the baud rate for the transmission of data, the baud rate for the reception of data need not be constrained by the particular requirements of DC—DC converter synchronization. According to this variant, UART 101 could continue to function as a unidirectional serial communications port for transmit-only peripheral devices.

Figure 4:
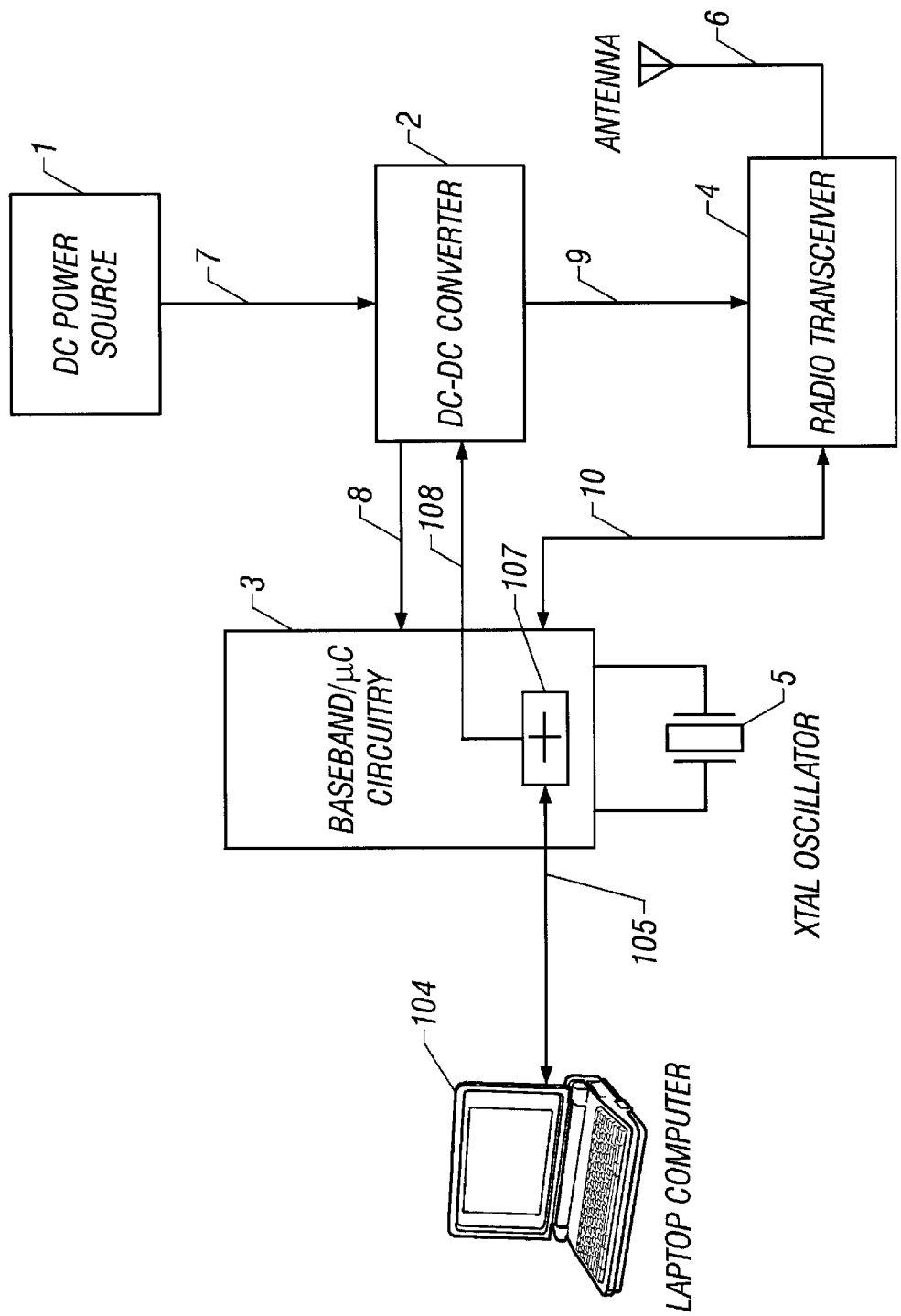
FIG. 4 is an illustration of a second embodiment of the subject invention.

A second embodiment of the subject invention is illustrated in FIG. 4 in which, compared to FIG. 3, like elements are referenced with like identifying numerals. In this embodiment, a single UART 107 within the baseband/microcontroller circuitry is configured to perform synchronization of DC—DC converter 2 and also provide a serial communications port for communication between microcontroller 12 of FIG. 10 and a peripheral device. The transmit clock of the UART is provided to the synchronization input of DC—DC converter 2, while at the same time, is used to control the baud rate of transmission between the microcontroller 12 and peripheral device 104.

This embodiment is particularly useful in the case in which a UART transmit clock frequency is possible which satisfies both the requirements of DC—DC converter synchronization and serial transmission of data to a peripheral device, and it is desired to operate the UART in a shared mode of operation in accordance with this embodiment in which the UART performs both DC—DC converter synchronization and serial transmission of data to a peripheral device.

In a first variant of this embodiment, UART 107 is configured to function as a bidirectional serial communications port, and in a second variant, UART 107 is configured to function as a unidirectional serial communications port for transmit-only peripheral devices.

Figure 5A:
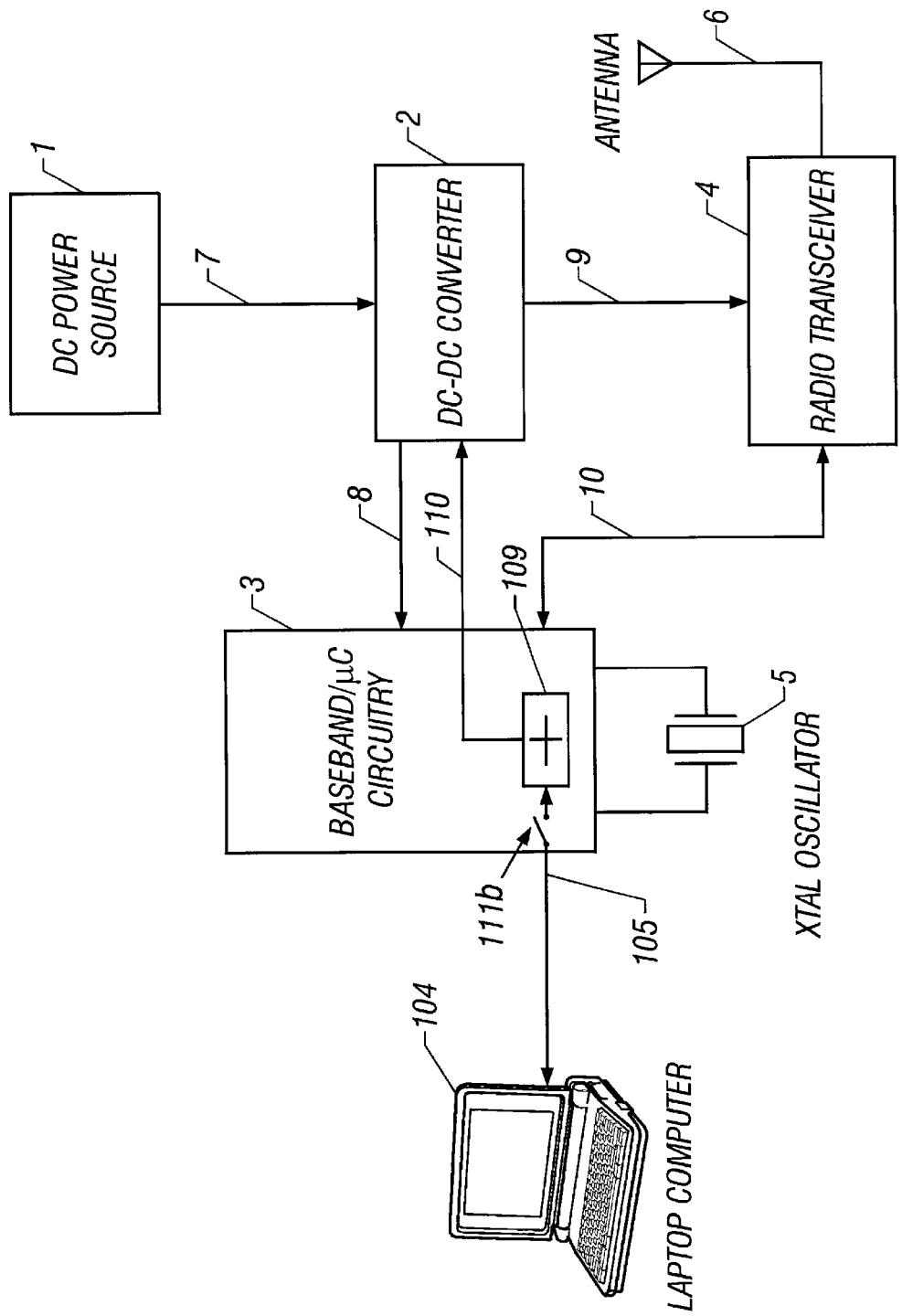
FIGS. 5(a), 5(b), 5(c), and 5(d) are illustrations of a third embodiment of the subject invention, and variants thereof.

A third embodiment of the subject invention is illustrated in FIG. 5(a), in which, compared to FIG. 4, like elements are referenced with like identifying numerals. According to this embodiment, UART 109 is configured to perform the function of DC—DC converter synchronization, and selectively function as a serial communications port to peripheral device 104.

According to this embodiment, the transmit clock of UART 109 is provided to the synchronization input of DC—DC converter 2 in the same manner described previously. In addition, UART 109 is selectively enabled to function as a serial communications port to peripheral device 104 through switch 111b. When the switch is closed, UART 109 is enabled to function as a serial communications port, while when it is open, UART 109 is disabled from doing so.

When it is desired to have UART 109 function as a serial communications port for microcontroller 12, switch 111b is closed, and when it is desired that UART 109 not function in this manner, switch 111b is opened.

Figure 5B:
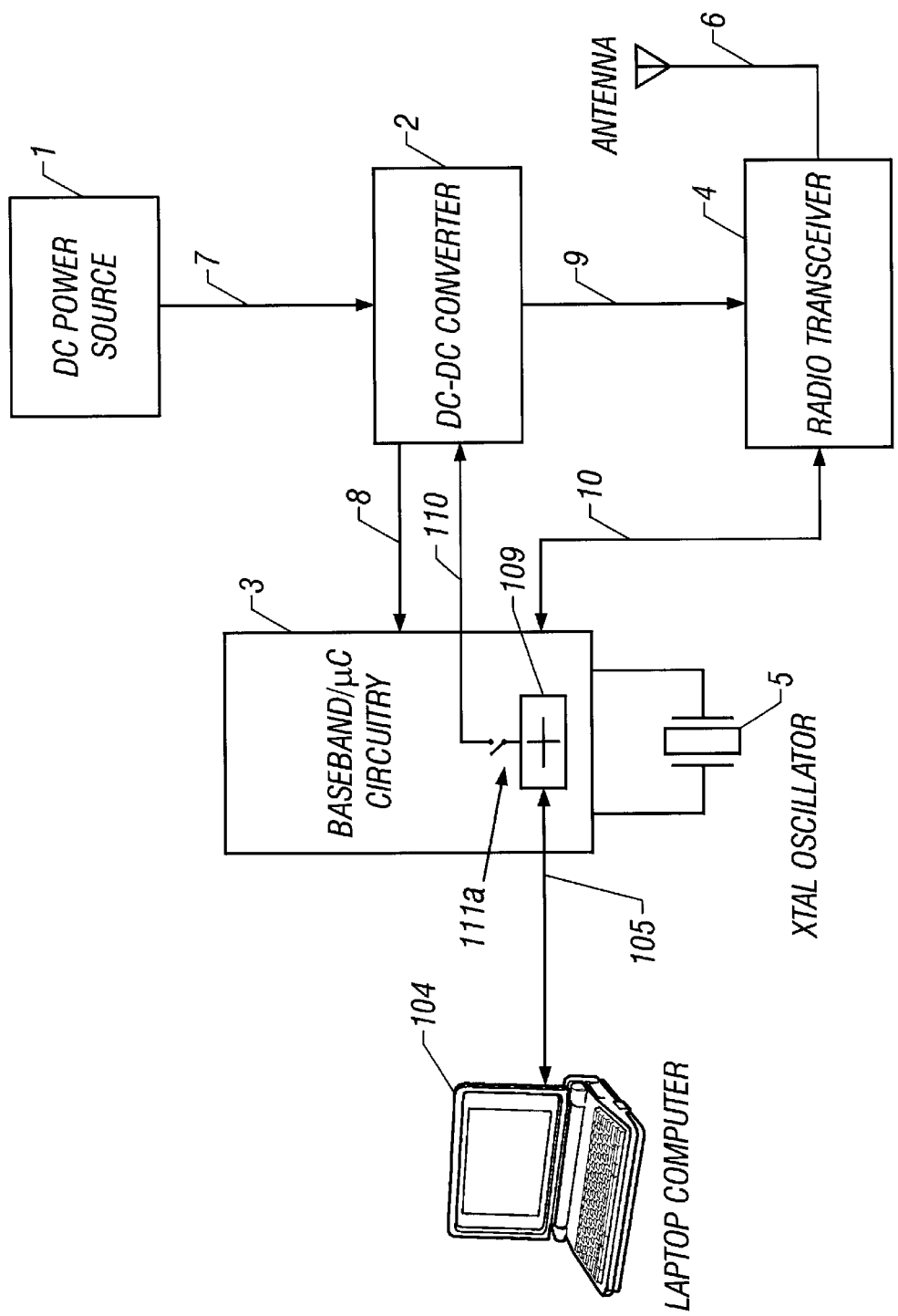

A variant of this third embodiment is illustrated in FIG. 5(b), in which compared with FIG. 5(a), like elements are referred to with like identifying numerals. According to this variant, UART 109 is continuously configured to function as a serial communications port for microcontroller 12, either for bidirectional or unidirectional transmission of data. In addition, the transmit clock of UART 109 is selectively coupled to the synchronization input of DC—DC converter 2 through switch 111a. When the switch is closed, the transmit clock is provided to the synchronization input of the DC—DC converter, and when the switch is open, the transmit clock is inhibited from passage to the synchronization input of the DC—DC converter.

This variant is particularly useful in those cases in which it is desirable to have a single UART perform DC—DC converter synchronization and function as a serial communications port, and there are times in which DC—DC synchronization can be turned off without unacceptable consequences. Such a case might be in applications involving transmission of information by the transceiver when any error resulting from lack of DC—DC converter synchronization can be tolerated. An example of such a case might be applications involving the transmission of voice or audio information, in which error tolerance might be higher than in applications involving the transmission of digital information.

Figure 5C:
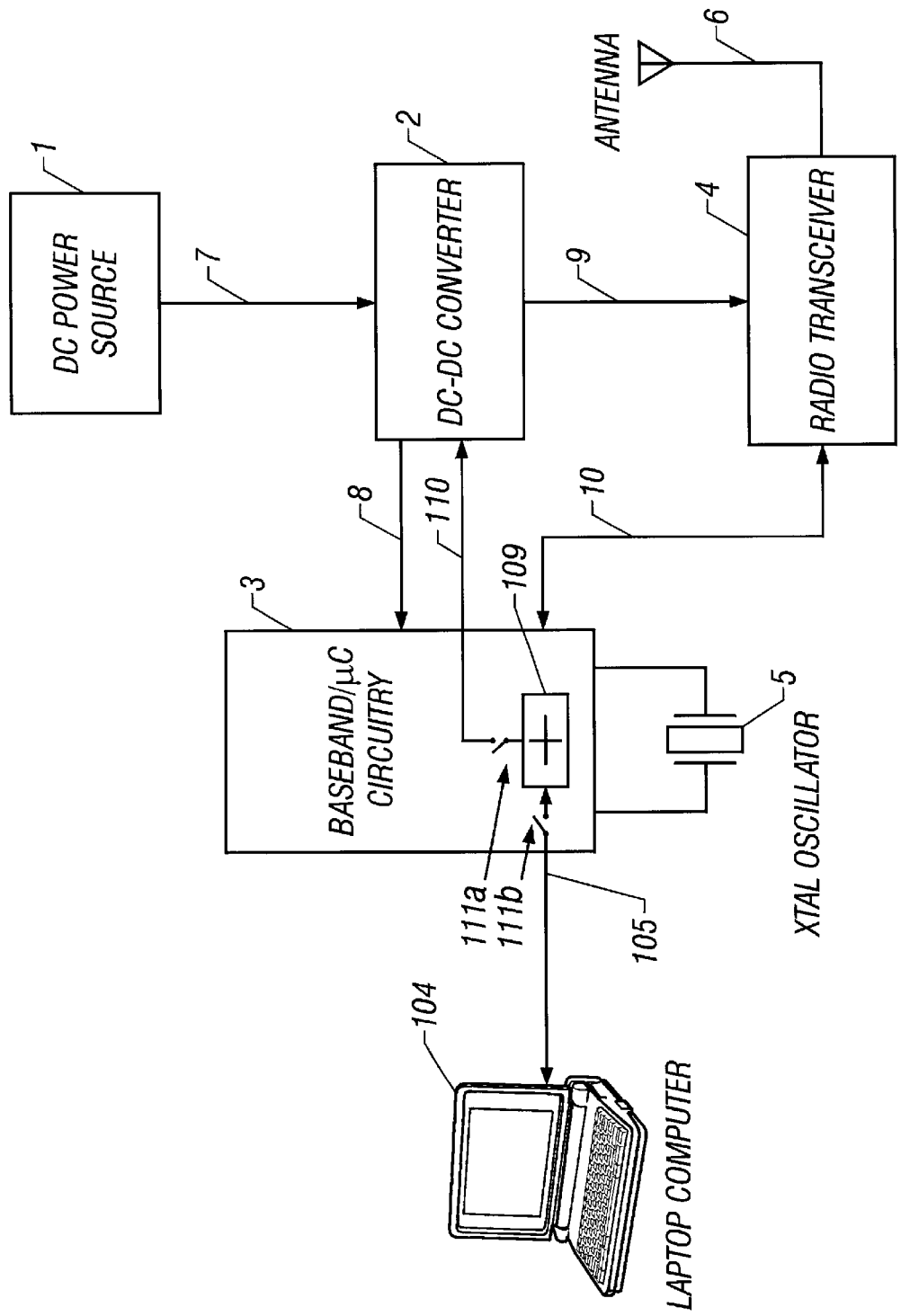

Another variant of this third embodiment is illustrated in FIG. 5(c), in which, compared with FIGS. 5(a) and 5(b), like elements are referred to with like identifying numerals. According to this variant, UART 109 is selectively enabled to function as a serial communications port through switch 111b, while at the same time, the transmit clock of UART 109 is selectively coupled to the synchronization input of DC—DC converter 2 through switch 111a.

It should be appreciated that this variant encompasses situations in which either of both of the transmit and receive functions of UART 109 in relation to peripheral device 104 are under the control of switch 111b, and situations in which UART 109 is continuously enabled to receive data from peripheral device 104, and only the transmit function of UART 109 is under the control of switch 111b.

Figure 5D:
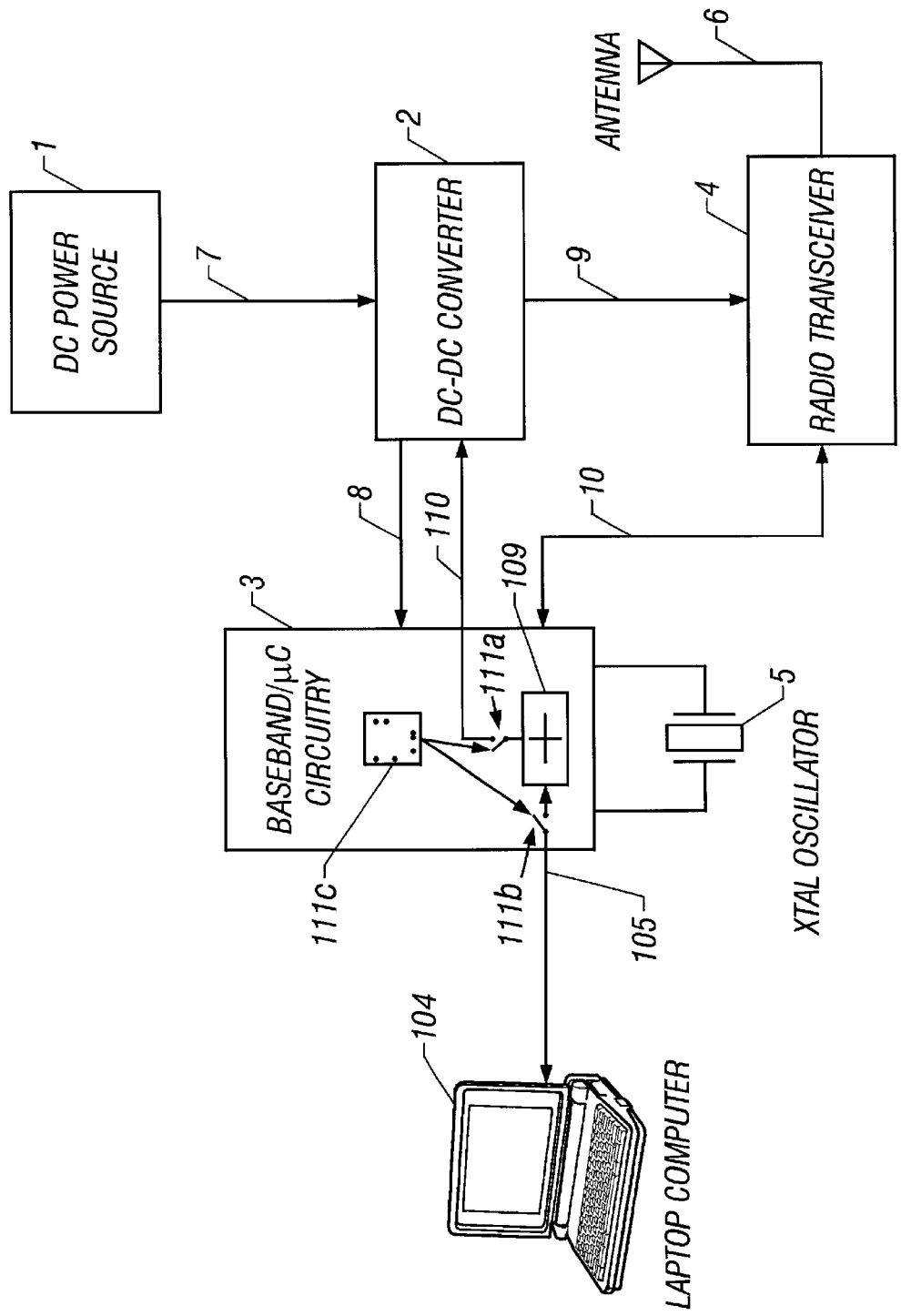

Another variant of this third embodiment is illustrated in FIG. 5(d), in which, compared with FIGS. 5(a)–5(c), like elements are referred to with like identifying numerals. According to this variant, UART 109 is selectively enabled to function as a serial communications port through switch 111b, while, at the same time, the transmit clock of UART 109 is selectively coupled to the synchronization input of DC—DC converter 2 through switch 111a, and switches 111a and 111b are under the control of multiplexor 111c. The use of multiplexor 111c to control switches 111a and 111b ensures that only one of these two switches will be closed at a time.

It should be appreciated that embodiments are possible in which the frequency band of the transceiver and the required chopping frequency of the DC—DC converter are both stored in a register or buffer which is accessible by the microcontroller, and the microcontroller is configured to utilize this information to determine a frequency for the UART transmit clock which is appropriate for DC—DC converter synchronization, and which avoids interference with the frequency band of the transceiver, i.e., it lacks harmonics which overlap with this frequency band.

Such embodiments are particularly useful for the case in which the frequency band of the transceiver is variable, and the frequency of DC—DC converter synchronization must also be variable to accommodate changes in the frequency band of the transceiver.

Still further, it should be appreciated that embodiments are possible in which the required transmit baud rate of a peripheral device is stored in a buffer or register which is accessible by the microcontroller, and the microcontroller is configured to utilize this information to determine if it is possible to use a single UART for both DC—DC converter synchronization and to transmit information to a peripheral device. Such information is particularly useful in the case in which the required transmit baud rate of the peripheral device is a variable. By accessing this information, the microcontroller could determine the appropriate mode of operation of the UART, i.e., in the dedicated mode described in relation to the first embodiment in which the UART is dedicated to the function of DC—DC converter synchronization, the shared mode described in relation to the second embodiment in which the UART is configured to perform both the function of DC—DC converter synchronization and serial transmission to a peripheral device, or one of the switched or multiplexed modes described in relation to the third embodiment.

Still further, a variant of the third embodiment is possible in which one or the other of switches 111a and 111b are under the control of the microcontroller, and the microcontroller uses the information described in the foregoing paragraphs to selectively actuate these elements. In the case in which a dedicated mode of operation is called for, the microcontroller would open switch 111b and close switch 111a, while in the case in which a shared mode of operation is called for, the microcontroller would close both switches 111a and 111b. In the case in which a synchronization-disabled mode of operation is called for, the microcontroller would open switch 111a, and close switch 111b.

In the case in which a multiplexed mode of operation is called for, the microcontroller would allow multiplexor 111c to retain control of the switches, and then direct the multiplexor to switch back and forth between a dedicated mode of operation, in which the UART is dedicated to the function of DC—DC converter synchronization, and a synchronization-disabled mode of operation, in which DC—DC converter synchronization is disabled, and the UART functions as a serial communications port.

It should be appreciated that in the foregoing embodiments or variants of embodiments involving a shared mode of operation, it is necessary to achieve compatibility with the DC—DC converter synchronization frequency and the transmit baud rate since it is the UART transmit clock which is used for both functions. In the case in which another clock of a serial communications channel or port is used for these two functions, such as the receiver clock, this requirement would change.

It should be appreciated that, in any of the foregoing embodiments, it is not critical that any of the UARTs discussed above be part of the baseband/microcontroller circuitry. Instead, it should be appreciated that embodiments are possible, including variants of the foregoing embodiments, in which UARTS for performing either or both of DC—DC converter synchronization and serial communications are configured separate from the baseband/microcontroller circuitry.

Figure 6:
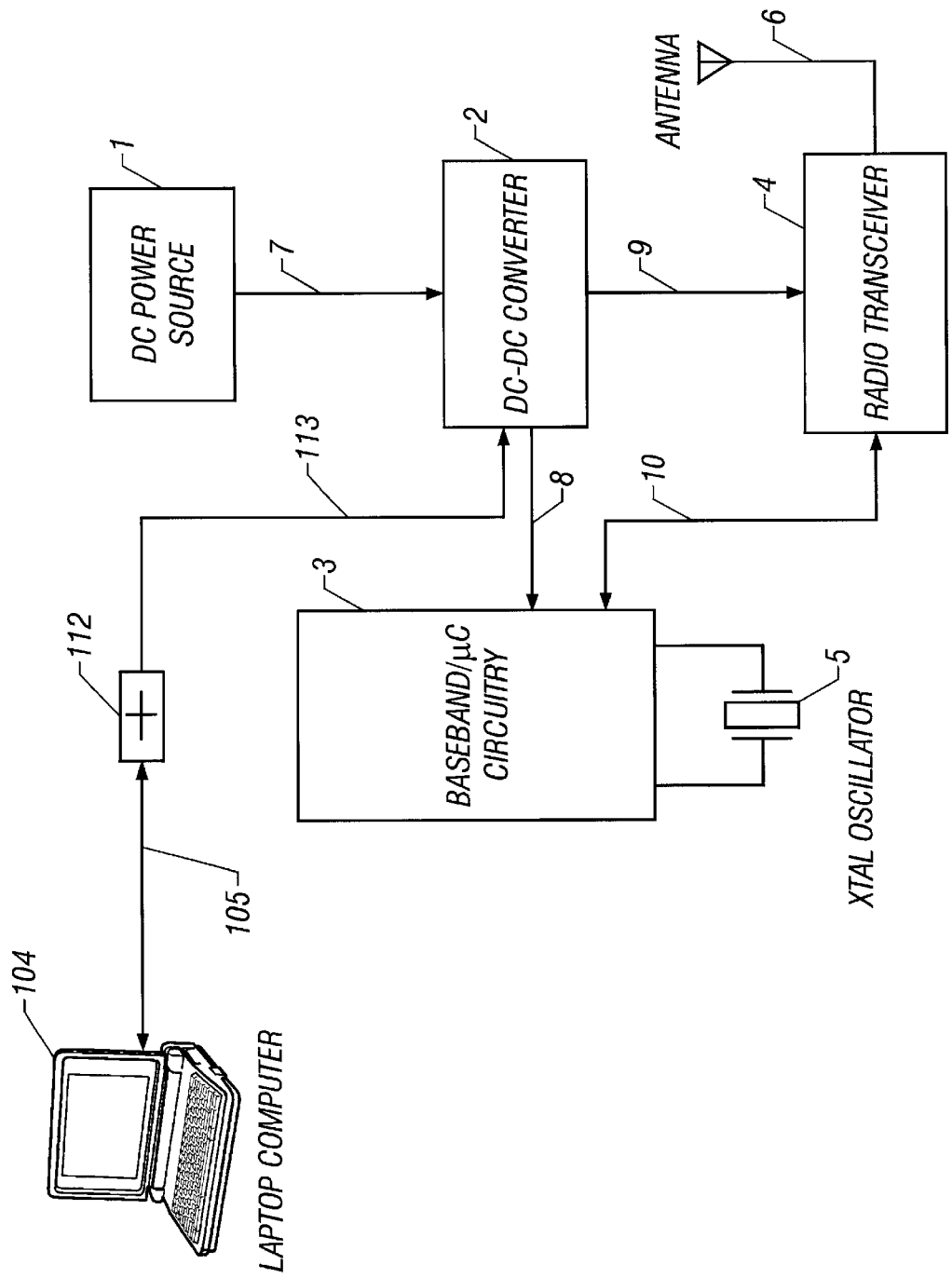
FIG. 6 is an illustration of a fourth embodiment of the subject invention.

FIG. 6 illustrates a variant of the foregoing second embodiment in which UART 112 is configured separate from baseband/microcontroller circuitry 3. Although this figure is in terms of the second embodiment, it should be appreciated that the principle thereof—a UART separate and apart from the baseband circuitry/microcontroller—is equally applicable to all the foregoing embodiments.

It should further be appreciated that additional embodiments, or variants of the foregoing embodiments, are possible in which circuitry is added to modify the transmit clock of the UART prior to inputting the same to the DC—DC converter 2.

Figure 7:
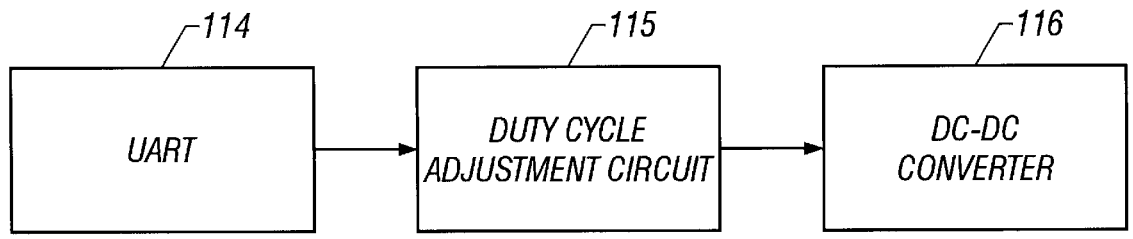
FIG. 7 illustrates a block diagram of a variant of any of the foregoing embodiments in which an adjustment is made to the duty cycle of the synchronization clock.

Such an embodiment, or variant of an embodiment, is illustrated in FIG. 7. As shown, the transmit clock of UART 114 is provided to the synchronization input of DC—DC converter 116 through duty cycle adjustment circuit 115, which functions to adjust the duty cycle of the transmit clock to meet the requirements of the DC—DC converter.

Figure 8:
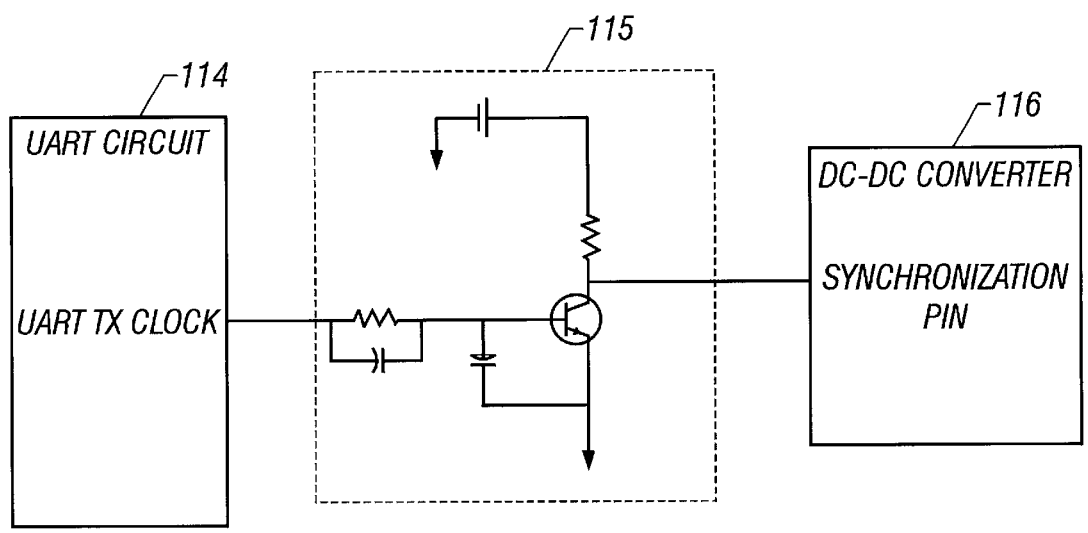
FIG. 8 is a circuit diagram of an embodiment of a circuit for adjusting the duty cycle of the synchronization clock.

A particular embodiment of a duty cycle adjustment circuit, in which the objective is to provide an output with a duty cycle of approximately 50%, is illustrated in FIG. 8 in which, compared to FIG. 7, like elements are referred to with like identifying numerals. The basic operation of this circuit is as follows: the circuit acts as a low-pass filter, and rejects the high harmonics of the synchronization signal. Thus, the transistor is driven permanently by the fundamental, which has a duty cycle of 50%, so the transistor output duty cycle is also about 50%. Further details regarding the operation of this circuit are within the ambit of those skilled in the art, and need not be further addressed here.

It should be further appreciated that embodiments are possible in which the transceiver 4 comprises or is replaced by a receiver, which is only capable of receiving information from a remote transmitter, or a transmitter, which is only capable of transmitting information to a remote receiver.

It should further be appreciated that the foregoing embodiments are not limited to mobile communications devices, but include mobile DC-powered devices such as GPS receivers.

It should further be appreciated that embodiments are possible in which the microcontroller 12, which comprises a microprocessor and related memory on a single chip, is replaced by a microprocessor, RISC processor or other digital computing device.

Figure 9A:
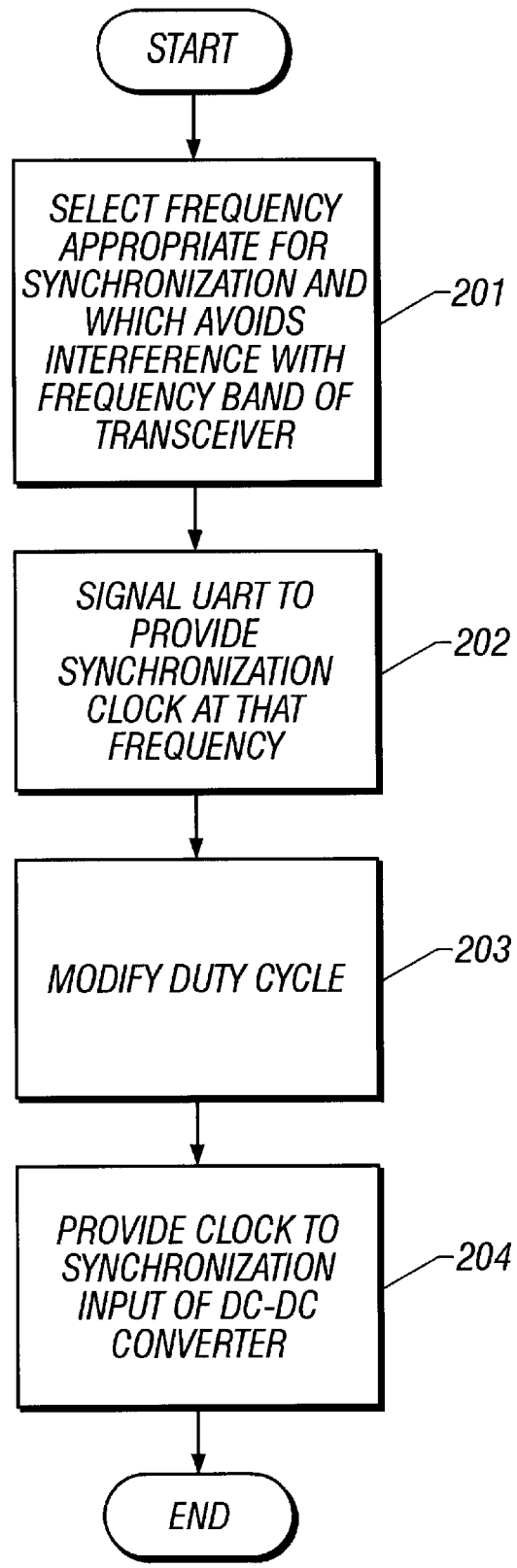
FIGS. 9(a), 9(b), 9(c), and 9(d) are flowcharts of methods of the subject invention.
Figure 9B:
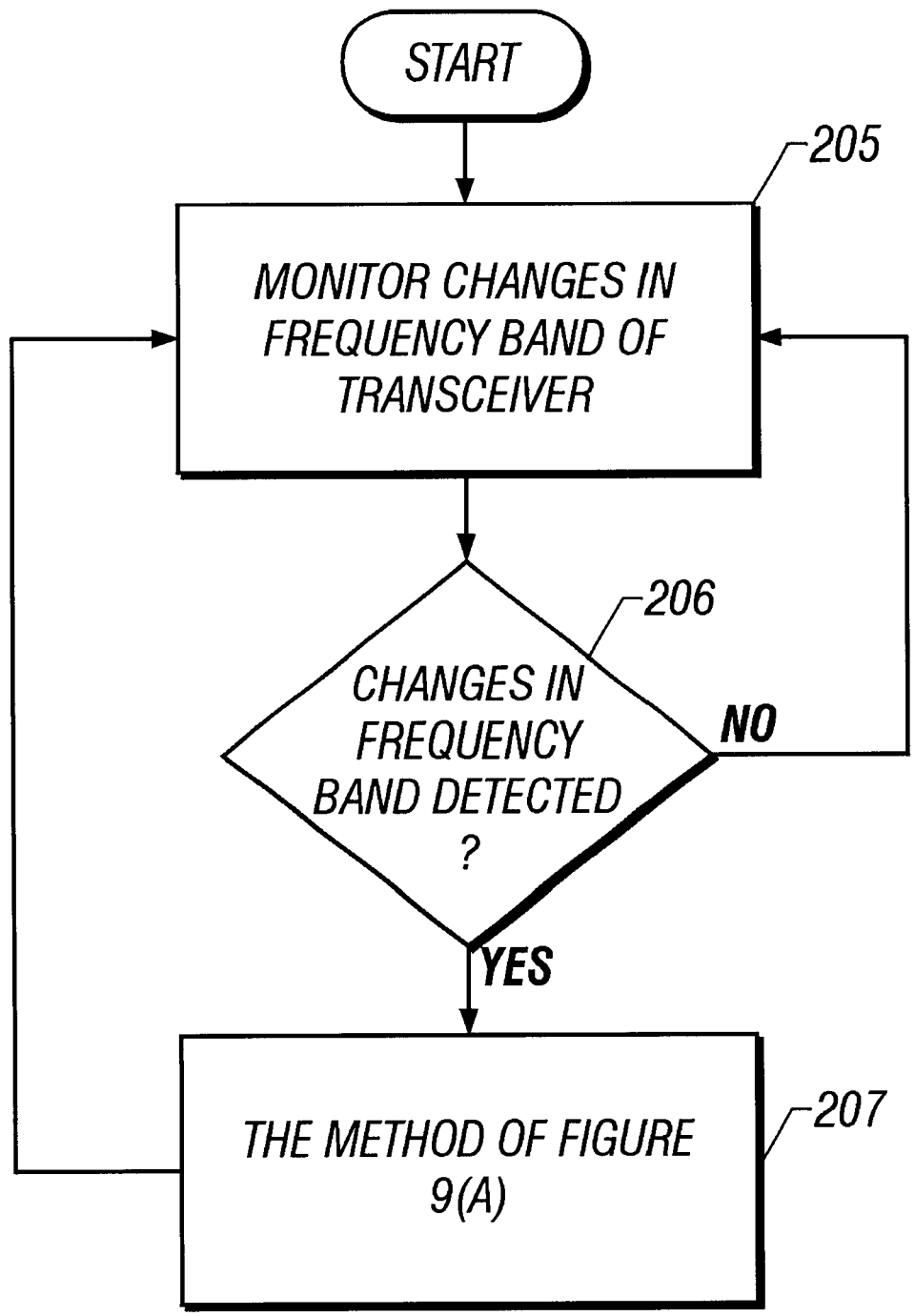
Figure 9C:
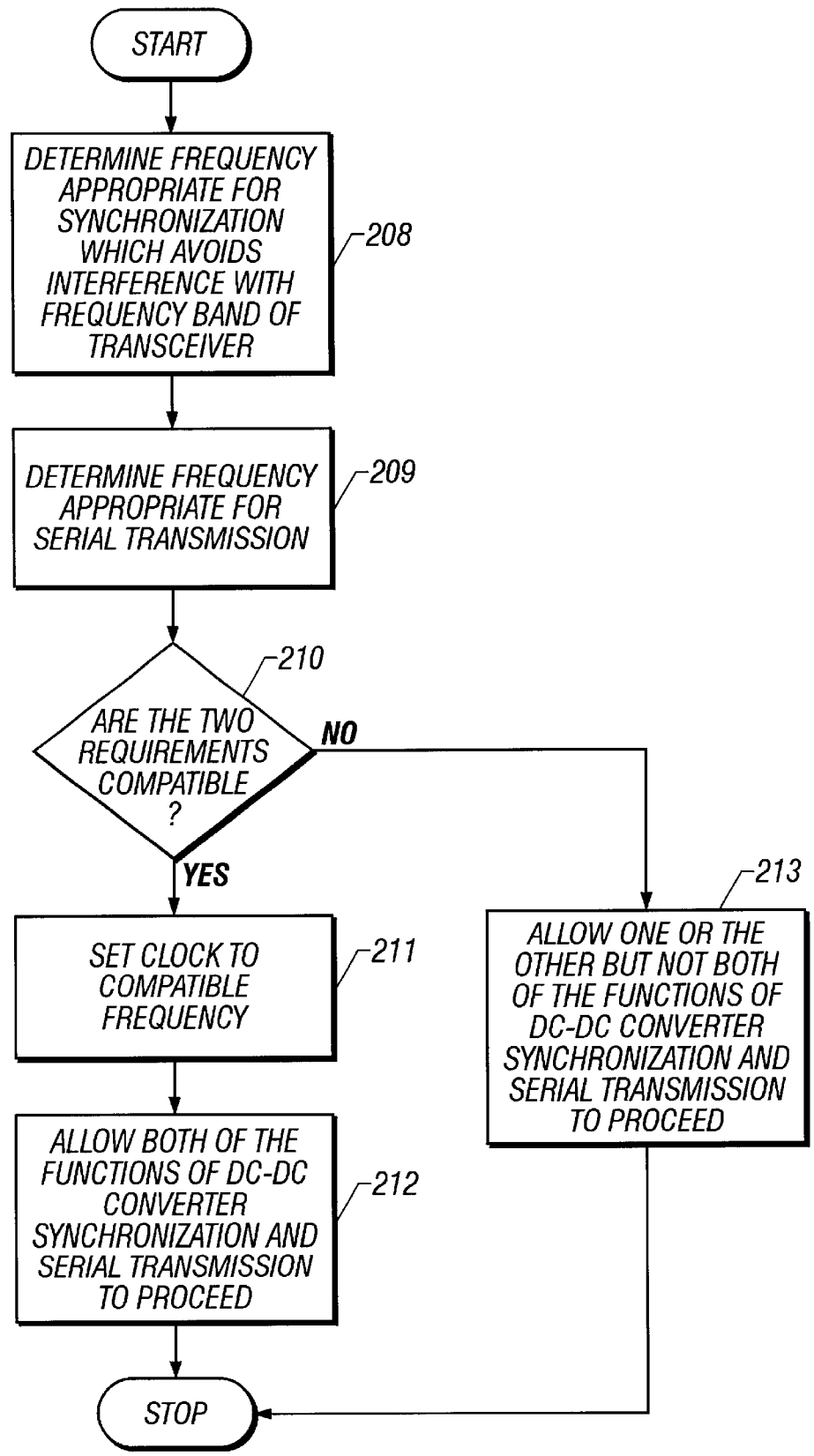

Several methods of the subject invention are illustrated in FIGS. 9(a)–9(c). A first method is illustrated in FIG. 9(a). According to this method, in step 201, a clock frequency which is appropriate for DC—DC converter synchronization, and which avoids interference with the frequency band of the transceiver, is determined. In one embodiment, this step occurs by determining a frequency which is compatible with the switching frequency of the DC—DC converter, and yet lacks harmonics that overlap the frequency band of the transceiver.

In step 202, a serial communications circuit having a variable clock output, such as a UART, is signaled to fix the clock output at the frequency determined in the previous step.

In step 203, which is an optional step, the duty cycle of the clock output of the serial communications circuit is modified to ensure compatibility with the DC—DC converter.

In step 204, the clock, after the optional modifications of step 203, is utilized to synchronize a second clock driving the switching action of the DC—DC converter. In one embodiment, this step occurs by providing the modified clock to the synchronization input of the DC—DC converter.

This method is particularly applicable in those cases in which the frequency band of the transceiver is fixed, and the frequency of the variable clock output from the serial communications device need only be set once.

A second method of the subject invention is illustrated in FIG. 9(b). This method is particularly appropriate in the case in which the frequency band of the transceiver is variable.

In step 205, changes in the frequency band of the transceiver are monitored.

In step 206, if a change has occurred, then in step 207, the method of FIG. 9(a) is performed, and a branch is then made back to step 205 to monitor additional changes in the frequency band of the transceiver. If a change has not occurred, then a branch is made back to step 205 to continue to monitor changes in the frequency band of the transceiver.

A third method of the subject invention is illustrated in FIG. 9(c). This method is particularly useful in those cases in which it is desired to determine if a single UART can function in a shared mode of operation, or whether the use of the circuit must be restricted to one or the other of the functions of DC—DC converter synchronization and serial transmission of data to a peripheral device.

If so, in step 210, a branch is made to step 211. If not, a branch is made to step 213.

In step 211, a variable output clock of a serial communications circuit such as a UART is fixed at the frequency which has been determined in step 208.

In step 212, it having been determined that dual functionality is possible, the serial communications circuit and/or related switches and the like are configured to allow the circuit to perform DC—DC converter synchronization, and function as a serial port to a peripheral device.

In step 213, it having been determined that dual functionality is not possible, the serial communications circuit and/or related switches and the like are configured to allow the circuit to function in one or the other but not both of the functions of DC—DC converter synchronization and serial transmission to a peripheral device.

In the case in which the DC—DC converter synchronization function is given priority over the serial transmission function, the frequency of the output clock of the serial communications circuit is set to the frequency determined in step 208, and the output clock used to synchronize the clock driving the switching action of the DC—DC converter. In one embodiment, this occurs by coupling the output clock of the serial communications circuit to the synchronization input of the DC—DC converter. In addition, the serial transmission function of the circuit is disabled or kept disabled.

In the case in which the serial transmission function is given priority over the DC—DC converter synchronization function, the frequency of the output clock of the serial communications circuit is set to a frequency determined appropriate for serial transmission, and the circuit enabled or kept enabled for serial transmission. In addition, the DC—DC converter synchronization function of the circuit is disabled or kept disabled.

Figure 9D:
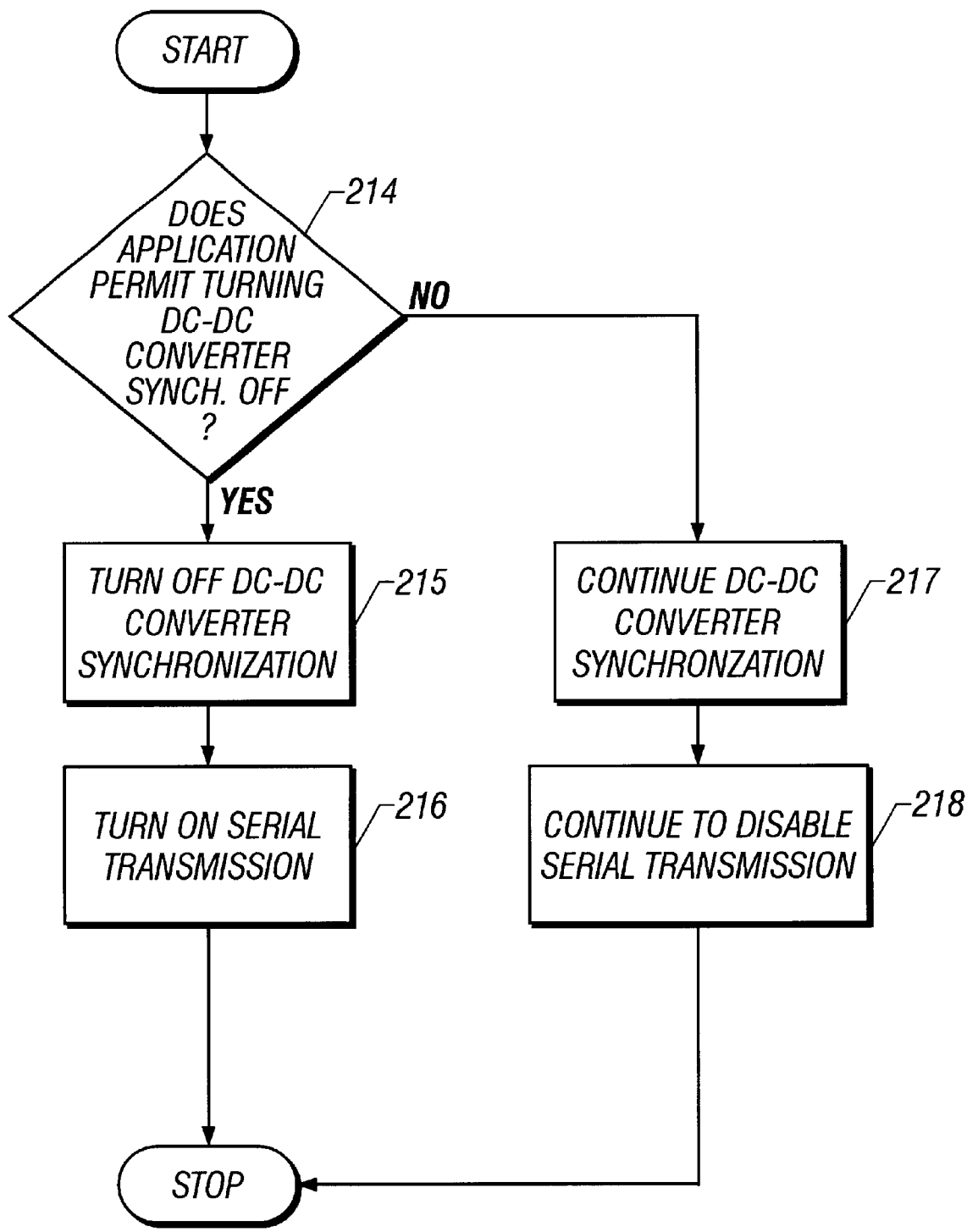

A fourth method of the subject invention is illustrated in FIG. 9(d). This method is particularly useful in those cases in which it is desired to selectively turn addition, the DC—DC converter synchronization function of the circuit is disabled or kept disabled.

A fourth method of the subject invention is illustrated in FIG. 9(d). This method is particularly useful in those cases in which it is desired to selectively turn off the DC—DC converter synchronization function in those cases in any resulting errors can be tolerated.

According to this method, in step 214, a determination is made whether the particular application in which the communications device is involved permits DC—DC converter synchronization to be turned off. If so, a branch is made to step 215, where the DC—DC converter synchronization function is turned off. Then, in step 216, the serial transmission function of the circuit is turned on.

If the particular application in which the communications device is involved does not permit DC—DC converter synchronization to be turned off, a branch is made to step 217. There, the DC—DC synchronization function is kept on. Then, in step 218, the serial transmission function is kept off.

EXAMPLE

Figure 12:
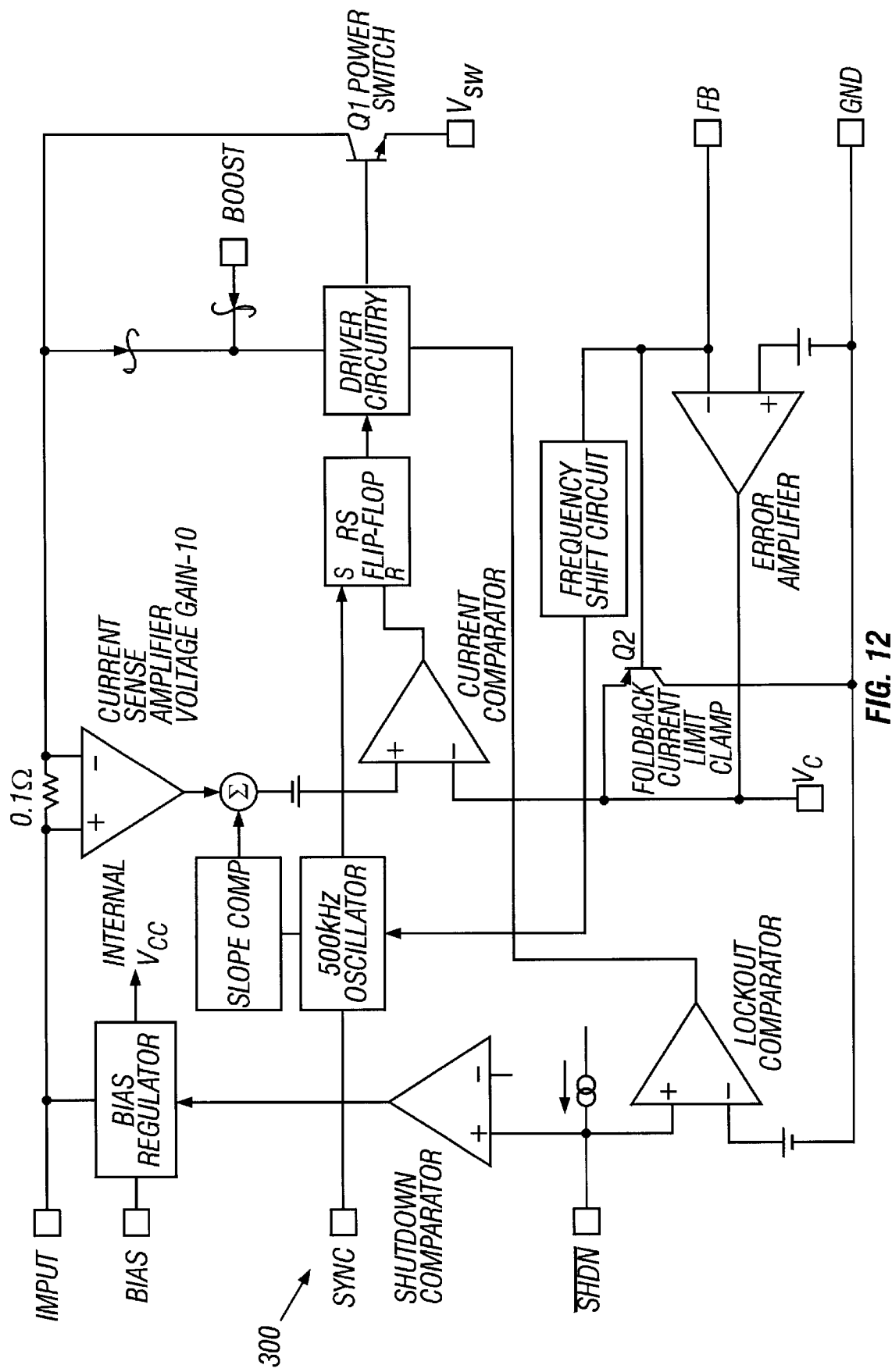
FIG. 12 is a block diagram of a Linear Technology LT1375 Switching Regulator.
Figure 13:
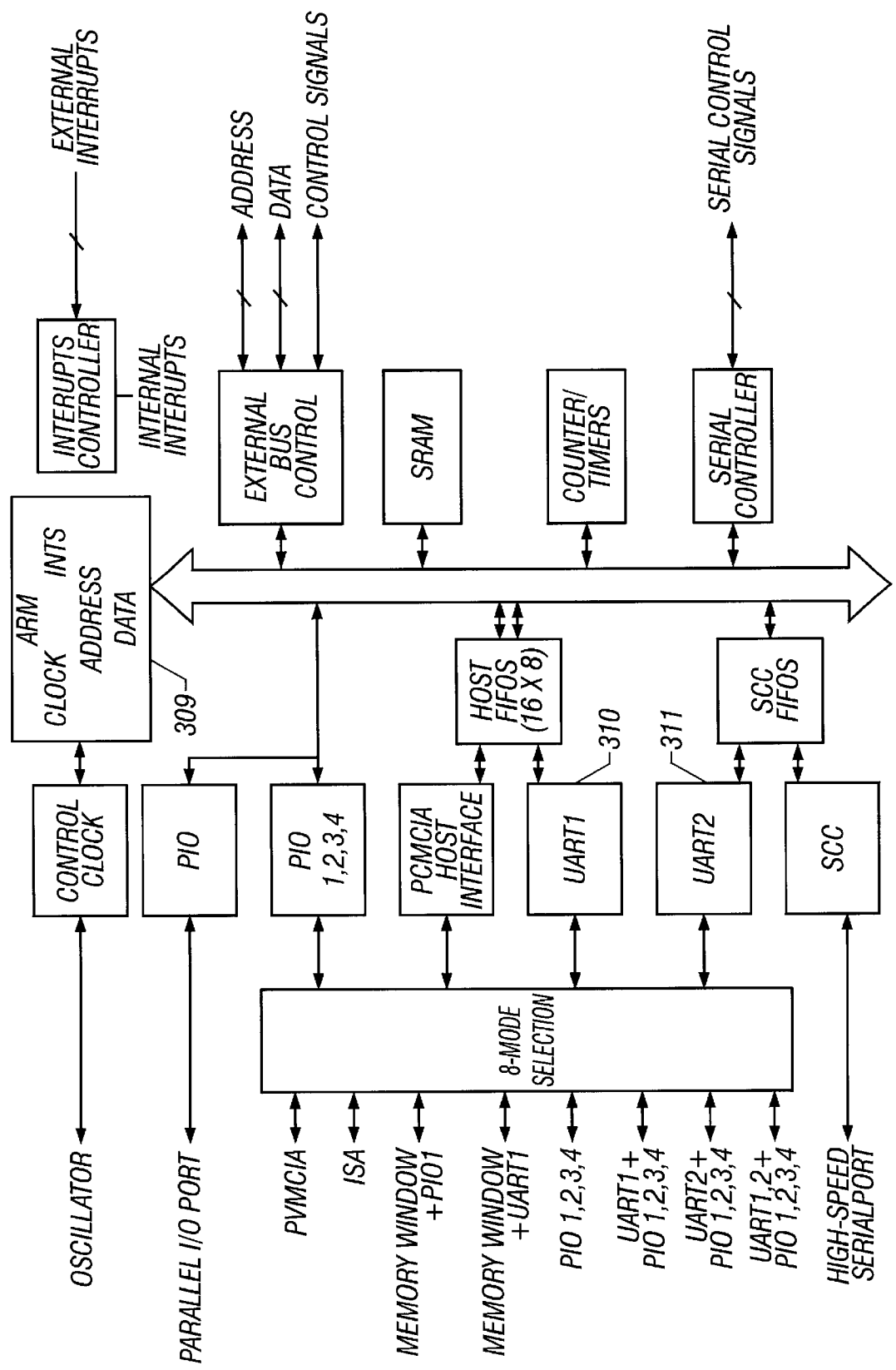
FIG. 13 is a block diagram of a VLSI Technology RUBY II Advanced Communication Processor.

A wireless modem, Uniden's Data 1000 CDPD modem, was constructed in accordance with the foregoing principles. A block diagram of the major components of the modem is represented by FIG. 10. The DC—DC converter employed in the modem is a Linear Technology LT1375 1.5A, 500 kHz Step-Down Switching Regulator configured to take a DC output of 7–24V and convert it to a DC output of 5V at a switching frequency of about 600 kHz. A block diagram of the LT1375 is illustrated in FIG. 12. The synchronization input for the LT1375, the SYNC input, is identified with numeral 300, and the internal clock used to drive the switching action of the LT1375, and which is configured to be synchronized by the SYNC input, is identified with numeral 301. Additional information is available in the data sheet for the Linear Technology LT1375/LT1376 1.5A, 500 KHz Step Down Switching Regulator, available at http::\\www.linear.com, which is hereby fully incorporated by reference herein as though set forth in full. The baseband/microcontroller circuitry employed in the modem is a VLSI Technology Geode two-chip chipset. The first chip, designated RUBY II, Part No. VPS 10101-1, comprises a 32-bit ARM RISC processor and related on-chip memory and circuitry, and two 16C450 UARTs. The second, designated TOPAZ, Part No. VWS 10201-5, includes the baseband circuit 11, which comprises DACs and the like for interfacing to the transceiver. A block diagram of the RUBY II chip is illustrated in FIG. 13. The ARM RISC processor is identified with numeral 309, and the two UARTS are identified with numerals 310 and 311. Additional information is available in the data sheet for the VLSI Technology RUBY II Advanced Communications Processor, available at http:://www.vlsi.com/library/pdf/ruby.pdf, which is hereby fully incorporated by reference herein as though set forth in full. A similar data sheet for the TOPAZ chip is also hereby fully incorporated by reference herein as though set forth in full. The transceiver employed has a frequency band of 824–894 MHz and meets the requirements of Part 409, Minimum Performance Standards for CDPD Mobile End Systems, of the CDPD Systems Specification Version 1.0. One of the UARTs is configured to act as a serial communications port for the RISC processor. The other is dedicated to the function of synchronizing the LT1375. The frequency or baud rate of the transmit clock output of this one UART is set to 614.4 kHz. This clock is input to the duty cycle adjustment circuit of FIG. 8 to adjust the duty cycle of the signal to about 50%. The modified signal is then provided to the SYNC input of the LT1375. The modem was tested over a wide range of operating conditions. It was found that synchronization of the internal clock of the LT1375 used to drive the switching process was successfully achieved.

While embodiments and applications of this invention have been shown and described, it should be apparent to those of ordinary skill in the art that these examples are merely illustrative, and that many other embodiments are possible without departing from the spirit and scope of the subject invention. Accordingly, the invention is not to be restricted, except as by the appended claims.

What is claimed is:

1. A mobile communications device comprising:
   a DC power supply for providing a first DC output voltage;
   a DC—DC converter having a synchronization input and configured to receive the first DC output voltage and produce, responsive to a switching waveform generated by a first internal clock, a second DC output voltage for powering components of the communications device;
   a transceiver coupled to an antenna having a frequency band;
   a baseband circuit having a signal line coupled to the transceiver;
   a microprocessor coupled to the baseband circuit through at least one signal line; and
   a UART coupled to the microprocessor having a second variable frequency transmit clock output coupled to the synchronization input of the DC—DC converter, with the second clock set at a frequency determined appropriate for synchronization of the first clock and to avoid substantial interference with the frequency band of the transceiver, whereby synchronization of the first clock by the second clock is achieved.

2. The device of claim 1 in which the UART is also configured to provide a serial communications port between the microprocessor and a peripheral device.

3. The device of claim 2 in which the UART is configured to provide a bidirectional serial communications port between the microprocessor and the peripheral device.

4. The device of claim 2 in which the UART is configured to provide a unidirectional serial communications port between the microprocessor and a transmit-only peripheral device.

5. The device of claim 1 in which the UART is configured to selectively provide a serial communications port between the microprocessor and a peripheral device.

6. The device of claim 5 in which the transmit clock of the UART is a variable determined responsive to a desired baud rate input to the UART, and the microprocessor is configured to provide the desired baud rate to the UART.

7. A mobile DC-powered device comprising:
  a DC power supply for providing a first DC output voltage;
  a DC—DC converter having a synchronization input and configured to receive the first DC output voltage and produce a second DC output voltage for powering components of the device;
  a transceiver coupled to an antenna;
  a baseband circuit having a signal line coupled to the transceiver;
  a microprocessor coupled to the baseband circuit through at least one signal line; and
  a UART coupled to the microprocessor having a transmit clock output coupled to the synchronization input of the DC—DC converter.

8. The device of claim 7 in which the UART is configured to provide a serial communications port between the microprocessor and a peripheral device.

9. The device of claim 7 in which the UART is configured to selectively provide a serial communications port between the microprocessor and a peripheral device.

10. The device of claim 9 in which the transmit clock of the UART is selectively coupled to the synchronization input of the DC—DC converter through a first switch.

11. The device of claim 10 in which the UART is configured to selectively provide a serial communications port between the microprocessor and the peripheral device through a second switch.

12. The device of claim 11 further comprising a multiplexor which is configured to actuate the first and second switches.

13. The device of claim 11 in which the microprocessor is configured to actuate the first and second switches.

14. The device of claim 13 in which the transceiver has a frequency band stored in a register which is accessible to the microprocessor.

15. The device of claim 14 in which the DC—DC converter has a switching frequency stored in a register which is accessible to the microprocessor.

16. The device of claim 15 in which the transmit clock has a frequency which is variable responsive to an input to the UART representative of a desired baud rate.

17. The device of claim 16 in which the microprocessor is configured to determine the desired baud rate responsive to the frequency band of the transceiver, and the switching frequency of the DC—DC converter.

18. The device of claim 17 in which the microprocessor is configured to input the desired baud rate to the UART.

19. A communications device comprising:
  a DC power supply for providing a first DC output voltage;
  a DC—DC converter configured to receive the first DC output voltage and produce, responsive to a switching waveform generated by a first clock, a second DC output voltage for powering components of the device;
  a transceiver coupled to an antenna;
  a baseband circuit having a signal line coupled to the transceiver;
  a microprocessor coupled to the baseband circuit through at least one signal line;
  a UART coupled to the microprocessor having a second variable frequency output clock set at a frequency determined appropriate for synchronization of the first clock; and
  circuitry configured to synchronize the first clock using the second clock.

20. A mobile DC-powered device comprising:
  a DC power supply for providing a first DC output voltage;
  a DC—DC converter configured to receive the first DC output voltage and produce, responsive to a switching action, a second DC output voltage for powering components of the device;
  a first clock for driving the switching action; and
  a serial communications circuit having a second variable frequency clock set at a frequency determined appropriate for DC—DC converter synchronization in which the second clock is configured to synchronize the first clock which drives the switching action of the DC—DC converter.

21. The device of claim 20 in which the serial communications circuit is a UART.

22. The device of claim 20 in which the DC power supply is a battery.

23. A method for synchronizing a DC—DC converter in a mobile DC-powered device comprising the steps of:
  selecting a synchronization frequency to avoid interference with a frequency band of the device;
  providing a variable frequency clock of a serial communications circuit of the device;
  setting the frequency of the clock to the synchronization frequency;
  converting a first DC voltage to a second DC voltage using a switching waveform having a frequency;
  using the second DC voltage to power the device; and
  synchronizing the frequency of the switching waveform using the clock of the serial communications circuit.

24. The method of claim 23 in which the selecting step comprises selecting a synchronization frequency having harmonics which do not overlap the frequency band.

25. The method of claim 23 in which the serial communications circuit is a UART.

26. The method of claim 23 in which the clock is a transmit clock.

27. The method of claim 23 in which the waveform is a chopping waveform.

28. The method claim 23 in which the clock has a duty cycle, the method of further comprising adjusting the duty cycle of the clock.

29. A method for synchronizing a DC—DC converter in a mobile communications device comprising the steps of:
  providing a transceiver having a variable frequency band;

performing the following steps upon determining that a change in the frequency band of the transceiver has occurred:
selecting a synchronization frequency to avoid interference with the frequency band of the transceiver;
providing a variable frequency clock of a serial communications circuit of the communications device;
setting the frequency of the clock to the synchronization frequency;
converting a first DC voltage to a second DC voltage using a chopping waveform having a frequency;
using the second DC voltage to power the communications device; and
synchronizing the frequency of the chopping waveform using the clock of the serial communications circuit.

30. A method for synchronizing a DC—DC converter in a mobile communications device comprising the steps of:
selecting a synchronization frequency to avoid interference with a frequency band of the communications device;
determining if the frequency is also acceptable for serial transmission to a peripheral device;
if the frequency is also acceptable for serial transmission to a peripheral device, configuring a serial communications circuit to perform DC—DC converter synchronization and serial transmission to the peripheral device;
if the frequency is not acceptable for serial transmission to a peripheral device, configuring the serial communications circuit to only perform a selected one of DC—DC converter synchronization and serial transmission to the peripheral device.

31. The method of claim 30 in which the selected one is DC—DC converter synchronization.

32. A method for synchronizing a DC—DC converter in a mobile communications device comprising the following steps:
performing an application with the mobile communications device;
performing DC—DC converter synchronization with a variable frequency clock output of a serial communications circuit with the frequency thereof set to avoid interference with a frequency band of the device;
disabling the serial communications circuit from performing serial transmission to a peripheral device;
determining if the application permits disabling the DC—DC converter synchronization performed by the serial communications circuit;
if so, disabling the serial communications circuit from performing DC—DC converter synchronization, and enabling the circuit to perform serial transmission of data to the peripheral device; and
if not, continuing to perform DC—DC converter synchronization with the serial communications circuit, and continuing to disable the circuit from performing serial transmission to the peripheral device.

* * * * *